US008452188B2

(12) United States Patent
Shin et al.

(10) Patent No.: US 8,452,188 B2
(45) Date of Patent: May 28, 2013

(54) VISIBLE LIGHT COMMUNICATION METHOD AND SYSTEM

(75) Inventors: Hong-Seok Shin, Yongin-si (KR); Dae-Kwang Jung, Suwon-si (KR); Jeong-Seok Choi, Yongin-si (KR); Kyung-Woo Lee, Yongin-si (KR); Sung-Bum Park, Suwon-si (KR); Jae-Hun Cho, Yongin-si (KR)

(73) Assignee: Samsung Electronics Co., Ltd (KR)

( * ) Notice: Subject to any disclaimer, the term of this patent is extended or adjusted under 35 U.S.C. 154(b) by 492 days.

(21) Appl. No.: 12/707,381

(22) Filed: Feb. 17, 2010

(65) Prior Publication Data

US 2010/0209105 A1    Aug. 19, 2010

(30) Foreign Application Priority Data

Feb. 17, 2009  (KR) .................. 10-2009-0013045

(51) Int. Cl.
*H04B 10/00*  (2006.01)
*H04B 10/116*  (2006.01)
(52) U.S. Cl.
CPC .................... *H04B 10/116* (2013.01)
USPC ......................................................... 398/172
(58) Field of Classification Search
CPC ........................................... H04B 10/116
USPC ............................................. 398/99, 100, 172
See application file for complete search history.

(56) References Cited

U.S. PATENT DOCUMENTS

| 8,189,514 | B2 * | 5/2012 | Stanwood et al. | 370/329 |
|---|---|---|---|---|
| 2003/0165118 | A1 * | 9/2003 | Ota et al. | 370/252 |
| 2005/0158048 | A1 * | 7/2005 | Sung et al. | 398/66 |

* cited by examiner

*Primary Examiner* — Shi K Li
(74) *Attorney, Agent, or Firm* — The Farrell Law Firm, P.C.

(57) ABSTRACT

A Visible Light Communication (VLC) method in a VLC terminal, in which the VLC terminal requests initial access to an Access Point (AP) on a selected mini-slot among a plurality of mini-slots constituting a control slot, based on control information in a frame, sends an association request to the AP on an allocated uplink time slot, if the uplink time slot allocated to correspond to the selected mini-slot exists in control information in a next frame, and transmits data at a data rate appointed to the VLC terminal included in control information in the current frame using an association Identifier (ID) included in a response received in reply to the association request and the allocated uplink time slot.

24 Claims, 6 Drawing Sheets

In addition, descriptions of well-known functions and constructions are omitted herein for the sake of clarity and conciseness.

VLC is new communication technology that uses LEDs or Laser Diodes (LDs) as a light source. VLC can be roughly divided into a lighting infrastructure-based VLC realized between a lighting system with a communication function and terminals capable of VLC communication (hereinafter VLC terminals), and VLC realized between VLC terminals. The present invention may be applied to a system that can be used primarily for VLC related to lighting infrastructure facilities. However, the present invention is not limited to the lighting infrastructure facilities.

A configuration of the lighting infrastructure-based VLC system can be generally classified into a unidirectional communication system and a bidirectional communication system. In unidirectional communication, the lighting infrastructure can transmit information and the terminal can receive the data sent from the lighting infrastructure. In bidirectional communication, both of the lighting infrastructure and the terminal have a visible light transmission/reception module, the terminal can request desired information, and the lighting infrastructure can send the requested information.

Figure 1:
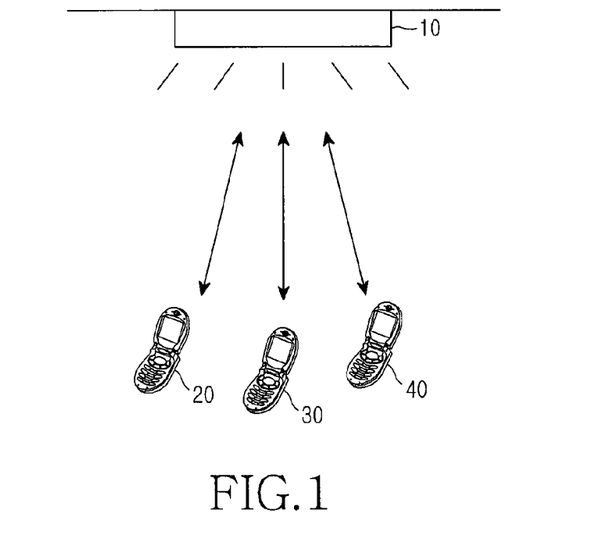

FIG. 1 illustrates a bidirectional VLC system according to an embodiment of the present invention. The VLC system includes a light source 10 and VLC terminals 20, 30 and 40. The light source 10, which consists of LEDs or LDs, serves as the lighting and performs data transmission/reception using visible light. The VLC terminals 20, 30 and 40, each of which includes a visible light transmission/reception module, perform data transmission/reception with the light source 10. The VLC terminals 20, 30 and 40 can be mobile terminals such as cell phones and Personal Data Assistants (PDAs), or desktop-type fixed terminals. In addition, VLC can be more efficiently used if it is combined with communication systems that use other wire/wireless communication media.

In the VLC system, the light source 10 is an AP in a fixed state, and a VLC network is built between the AP and MNs such as the VLC terminals 20, 30 and 40. Structurally, the AP is connected to an existing infrastructure such as the Internet.

In this VLC system, the AP serves as the lighting and is used for data transmission. The AP may be applied not only to the lighting devices such as lighting lamps, but also to all other devices that use LEDs or LDs, such as electronic display boards, street lamps, and traffic lights. The AP may receive data from MNs, or VLC terminals, and provide the data to a server. The AP may include a photo diode for sensing a light signal delivered from MNs, or VLC terminals. Also, the AP can receive user-desired data from the server and transmit the data to the VLC terminals. The VLC terminal may include a visible light reception module for receiving data transmitted from the AP, and a visible light transmission module for sending a user-desired command.

Figure 2:
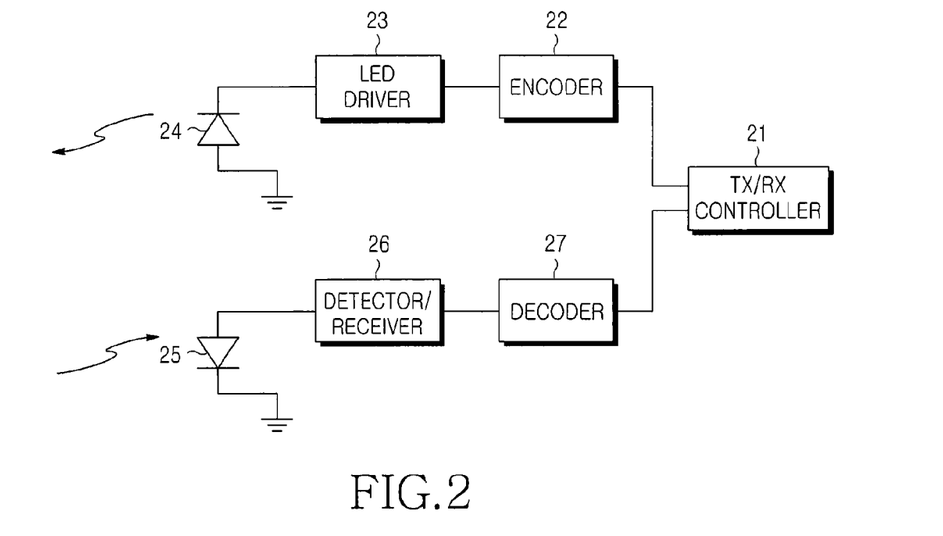

A structure of the VLC terminal is shown in FIG. 2. Referring to FIG. 2, a VLC terminal includes a transmission/reception controller 21, an encoder 22, an LED driver 23, an LED 24, a photodiode 25, a detector/receiver 26, and a decoder 27.

For VLC data transmission/reception, the transmission/reception controller 21 processes data, controls the encoder 22 and the decoder 27, and controls the overall operation of the VLC terminal. The encoder 22 encodes transmission data received from the transmission/reception controller 21, and outputs the encoded transmission data to the LED driver 23. The LED driver 23 optically modulates the data received from the encoder 22, and drives the LED 24 so that the transmission data may be delivered to an external device. In the present invention, the transmission/reception controller 21 controls initial access to an AP, an association process, and the operation of a VLC terminal that is needed for data transmission/reception.

The photodiode 25 senses a light signal delivered from an external device, converts the light signal into an electrical signal, and outputs the electrical signal to the detector/receiver 26. The detector/receiver 26 demodulates the electrical signal received from the photodiode 25 into data based on an optical wireless communication scheme, and outputs the data to the decoder 27, which decodes the input data and outputs the decoded data to the transmission/reception controller 21. The transmission/reception controller 21 properly processes received data being input from the decoder 27.

When a VLC system is configured as shown in FIG. 1, one light source 10, or one AP, can access a plurality of VLC terminals 20, 30 and 40. The AP, which is provided in the lighting infrastructure, is mostly unrestricted as to consumption power and device size, whereas the VLC terminals 20, 30 and 40 are preferably designed to be compact and consume less power since they may be detachably mounted to a mobile terminal.

In order to support point-to-multipoint communication in this VLC system, a multiple access scheme is required. A time division multiplexing scheme may be appropriate since a frequency band of a visible light is $3.88{\sim}7.89{\times}10^{14}$ Hz, which is very wide compared to that of RF communication, and communication is achieved using a very simple modulation technique.

Accordingly, a MAC protocol according to the present invention has applied an uplink multiple access scheme that can increase efficiency of system resources and minimize collision probability among the system resources based on the time division multiplexing scheme.

Figure 3:
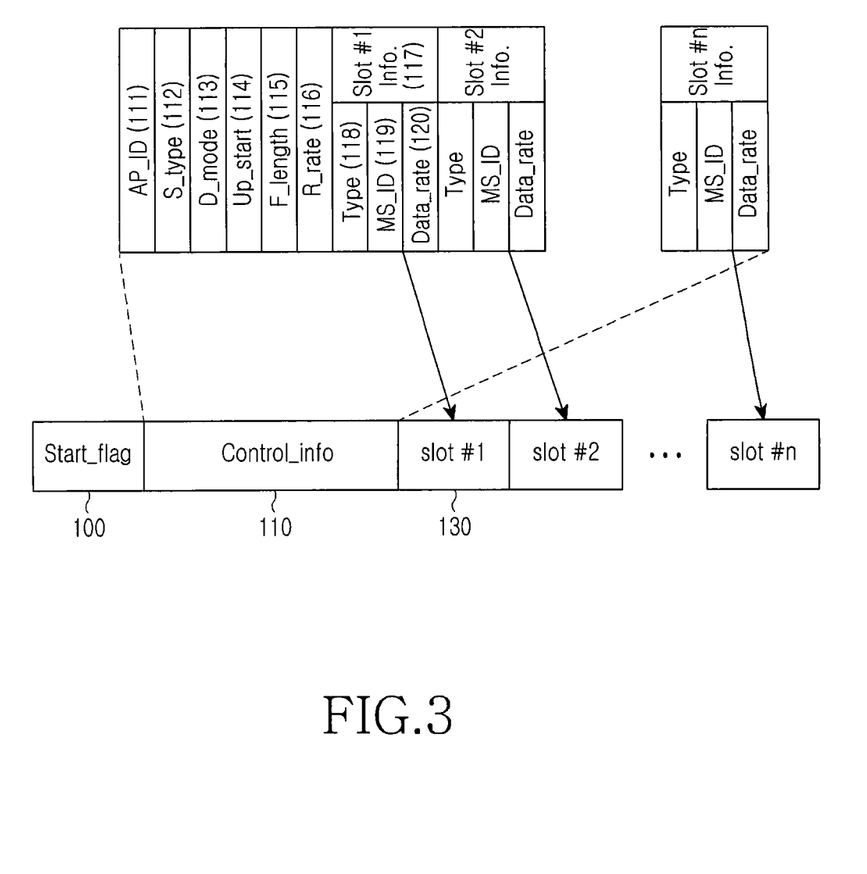

FIG. 3 illustrates a frame structure according to an embodiment of the present invention. Referring to FIG. 3, a frame includes a start flag period Start_flag 100, a control information period control_info 110 containing control information, and n time slots 130. Resource allocation for communication with a plurality of VLC terminals is performed using time slots, and information as to whether each terminal occupies its time slot is included in the control information period 110.

The control information period 110 further includes access slot information, an AP Identifier AP_ID 111, a service type S_type 112, a duplex mode D_mode 113, an uplink start slot Up_start 114, a frame length F_length 115, a reference rate R_rate 116, and slot information Slot#n_info 117.

In a lighting infrastructure-based VLC system, an AP ID plays an important role of identifying each AP. Based on the AP ID, it is possible to determine a location of an AP and locations of VLC terminals being adjacent to the AP, and to determine whether to store or provide particular data. This AP ID is indicated in the AP ID 111.

According to an embodiment of the present invention, services supported by the VLC system may be divided into three types: a Visible Local Area Network (LAN) (VL) service, an Informational Broadcast (IB) service, and a Peripheral Interface (PI) service, and a type of the service presently being provided in the VLC system is indicated in the service type S_type 112. The PI service indicates a point-to-point communication service for a VLC terminal, the IB service is a communication service that transmits and receives data through an electronic display board or the like on a broadcast basis, and the VL service is a communication service that uses a visible light instead of a wireless frequency or an infrared ray as a delivery medium in a wireless LAN system.

The VLC system may operate in a full duplex mode or a half duplex mode according to its physical feature, which is indicated in the duplex mode D_mode 113. When the VLC system operates in the full duplex mode, a downlink channel and an uplink channel exist independently, and thus may be reused in the time domain. When the VLC system operates in the half duplex mode, since a downlink channel and an uplink channel are identical, they should be distinguished in the time domain.

The uplink start slot Up_start 114, which indicates a time slot where an uplink starts, indicates a start point of an uplink time slot when the VLC system operates in the half duplex mode. As such, the uplink start slot Up_start 114 is only considered in the half duplex mode.

The frame length F_length 115 indicates a frame length, and has a standard such as 10 msec.

The reference rate R_rate 116 is used to indicate a reference rate when the reference rate is variable in data transmission.

The slot information Slot#n_info 117 includes a type Type 118 corresponding to each time slot, an ID MS_ID 119 of a VLC terminal to which the time slot is allocated, and a data rate $Data_{13}$ rate 120 of the time slot. The VLC terminal transmits and receives data over an uplink or a downlink using the time slot allocated thereto.

The VLC system ensures a high Signal-to-Noise Ratio (SNR), since a loss between an AP and a VLC terminal is guaranteed and the AP, or the light source, can be checked by sight. Because the VLC system, compared with an RF communication system, provides a shorter distance between a receiver and a transmitter and its signal cannot pass through walls, interference between neighboring APs is significantly lower than that in the existing communication system. On the contrary, since the VLC system has a definite boundary between communication areas and a significant change in signal attenuation per unit distance, it is desirable to use an adaptive rate control technique in order to maximize a data rate and minimize transfer errors of the VLC terminal. Therefore, respective slots are designed to operate at different data rates.

Changing the data rate can be accomplished in many different methods, one of which is described below as an example. A channel can be coded by 8B10B encoding before being transmitted. If an error occurs due to degradation of the channel during the transmission, a signal that does not exist in a 10B table may be received. In this case, a reception side may be aware of occurrence of an error. This represents a Symbol Error Rate (SER) and can become a basis for channel state measurement, based on which the data rate can be adjusted.

Figure 4:
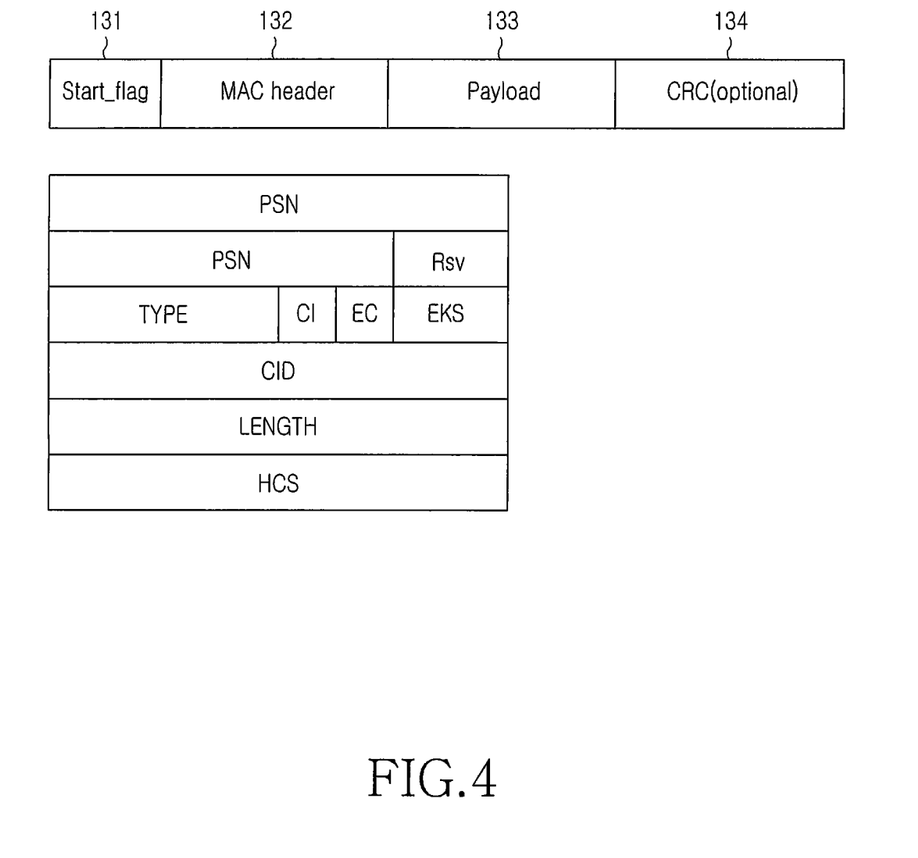

Accordingly, the data rate Data_rate 120 of the relevant time slot is included in the slot information Slot#n_info 117, and a structure of each time slot is as shown in FIG. 4.

Referring to FIG. 4, a time slot includes a start flag Start_flag 131, a MAC header 132, a Payload 133, and a Cyclic Redundancy Check (CRC) 134, which is optional. The MAC header 132 includes a Protocol data unit Sequence Number (PSN), type information TYPE indicating the presence of a sub-header, a CRC Indicator (CI), an Encryption Control (EC), an Encryption Key Sequence (EKS), a Connection ID (CID), total length information LENGTH of a Protocol Data Unit (PDU) in bytes, which includes a MAC header and a CRC, and a Header Check Sequence (HCS).

That is, the AP determines a data rate of a time slot allocated to each VLC terminal taking into account an allocation state of wireless resources, a type of the service being provided to a VLC terminal allocated a resource, and data type, and includes the determined data rate in the control information period 110 of the frame using the reference rate R_rate 116 and the data rate Data_rate 120 of the time slot. Consequently, each VLC terminal determines a data rate based on the reference rate R_rate 116 in the frame and the data rate Data_rate 120 of the time slot, which is included in the slot information Slot#n_info 117 allocated thereto, and then transmits data at the determined data rate.

Figure 5:
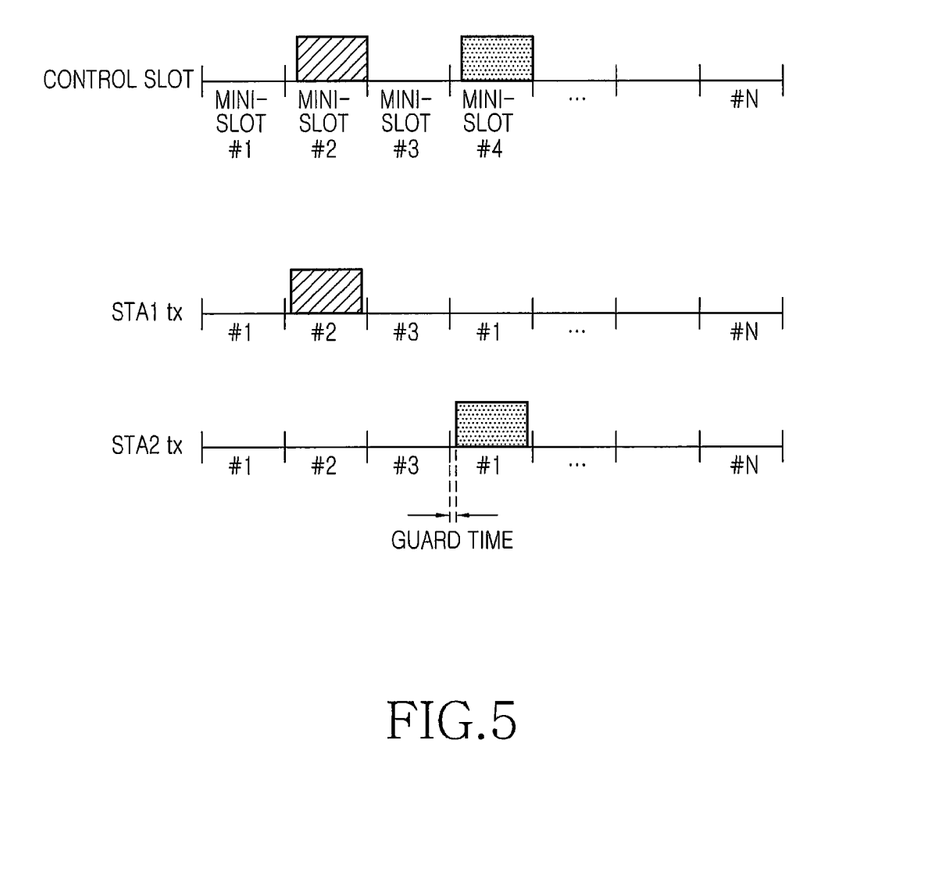
Figure 6:
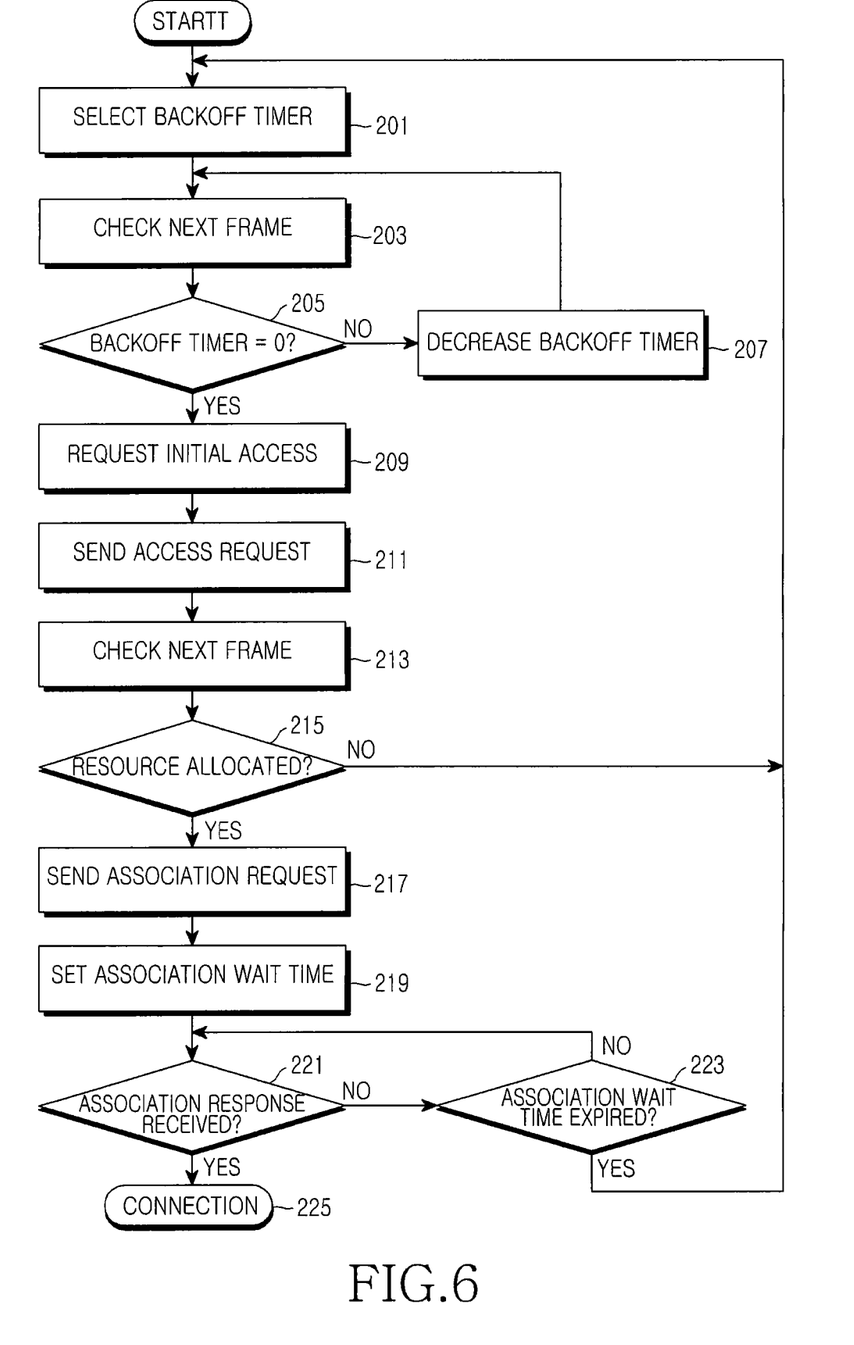

A process of establishing initial access to the AP 10 by each of the VLC terminals 20, 30 and 40 using the aforementioned frame structure will be described below with reference to FIGS. 5 and 6. FIG. 5 illustrates a control slot according to the present invention, and FIG. 6 illustrates an operation of a VLC terminal according to the present invention.

Referring to FIG. 5, an access slot C_slot, or a control slot, includes N mini-slots, and the AP broadcasts the control slot over the control information period control_info 110. Arrangement of mini-slots constituting the access slot is shown in FIG. 5.

A VLC terminal, which has not yet been associated with the AP, selects one of the N mini-slots for uplink resource allocation and then establishes initial access. The VLC terminal selects a mini-slot and repeatedly transmits a particular code and its own terminal ID on the selected mini-slot. In the present invention, a VLC terminal selects an arbitrary code from among control symbols K28.0, K28.2, K28.3, K28.4, and K28.6 of an 8B10B code and repeatedly transmits the selected code on one mini-slot. For example, as shown in FIG. 5, a VLC terminal STA1 may select a second mini-slot and transmit a control symbol of the 8B10B code, and a VLC terminal STA2 may select a fourth mini-slot and transmit a control symbol of the 8B10B code. Considering a transmission delay between the AP and the VLC terminals, guard times may exist before and after the mini-slot.

An initial access process and an association process using the mini-slots will be described with reference to FIG. 6. A VLC terminal, which has not yet been associated to the AP, analyzes control information 110 from the AP to attempt association. Through the analysis, the VLC terminal determines a position of a control slot, the number of mini-slots, and length information of the mini-slots on the frame. The VLC terminal selects a backoff timer value among value from zero(0) to the maximum value, in step 201. The VLC terminal determines a backoff timer on a frame basis in step 203. If the backoff timer is not equal to zero (0) in step 205, the VLC terminal decreases the backoff timer by 1 in step 207. If the backoff timer equals zero (0), the VLC terminal arbitrarily selects one of the total N mini-slots in a frame at which a value of the backoff timer becomes zero (0), in step 209, and requests initial access by transmitting an 8B10B control symbol on the selected mini-slot in step 211.

Based on resource allocation information in control information of a next frame, the VLC terminal determines whether resource allocation has been performed on the mini-slot it transmitted, in steps 213 and 215. If resource allocation has not been conducted, it indicates that the AP has not received an initial access request. In this case, the VLC terminal returns to step 201 and arbitrarily re-selects a backoff timer. Thereafter, the VLC terminal re-performs the initial access process in steps 203 to 211.

If the resource allocation has been performed, the VLC terminal requests association by sending an ASsociation REQuest (AS-REQ) message to the AP using the allocated resource in step 217. At the same time, the VLC terminal sets a reception wait time or an association wait time (T_assoc timer) regarding an ASsociation ReSPonse (AS-RSP) message responding to the AS-REQ message in step 219. If the AS-RSP message is received within the set association wait time in step 221, the VLC terminal determines that the association wait time has expired and the association has been successfully performed. However, if no AS-RSP message is received during the association wait time in step 221, the VLC terminal determines in step 223 whether the association wait time has expired. If the association wait time has expired in step 223, the VLC terminal returns step 201 and re-performs the entire process, determining that the requested association has failed.

Figure 7:
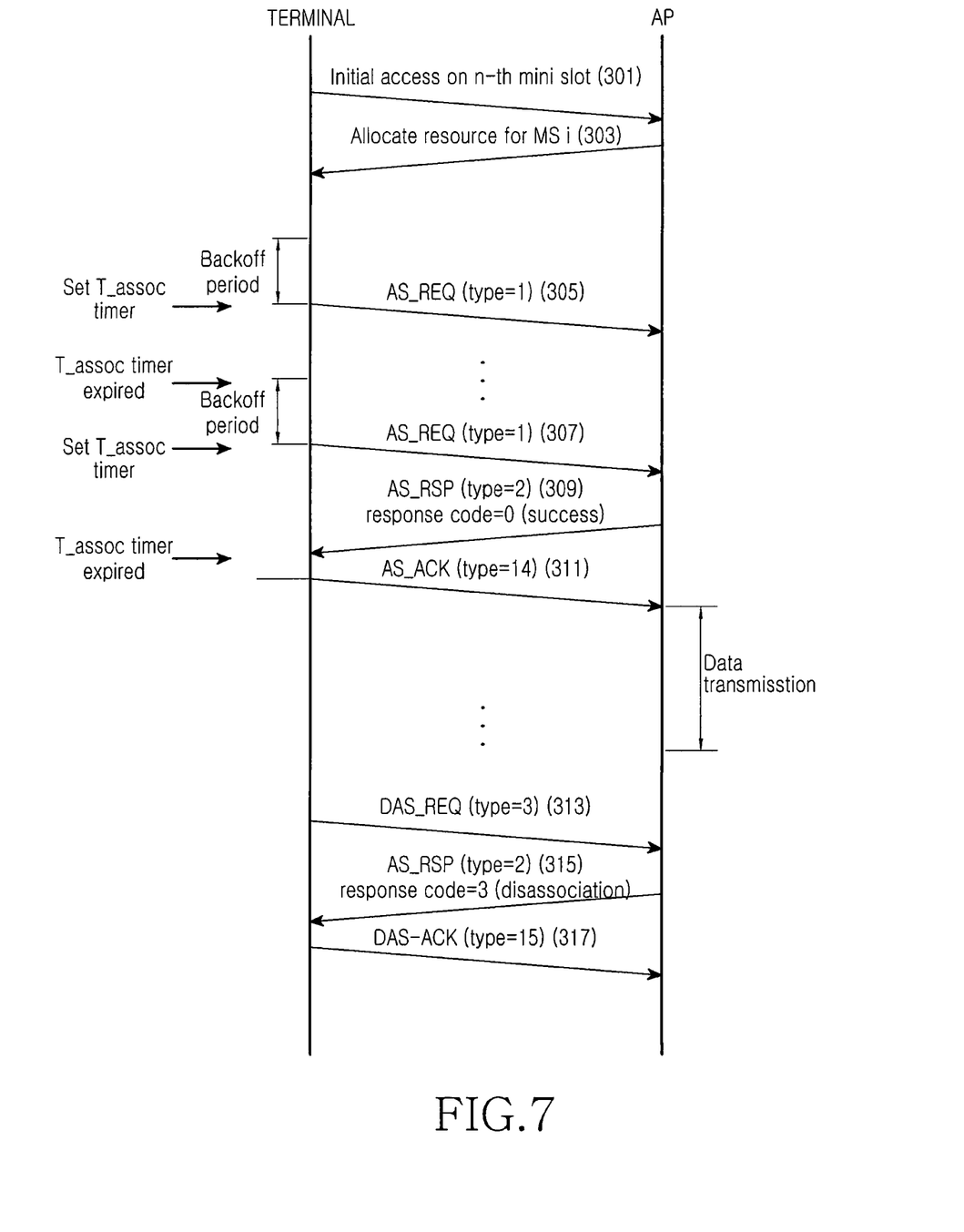

FIG. 7 illustrates a messaging process between a VLC terminal and an AP according to an embodiment of the present invention.

Referring to FIG. 7, if a VLC terminal requests initial access on a certain mini-slot in step 301, an AP analyzes a signal received in each mini-slot and determines an 8B10B control symbol of the signal. If an 8B10B control symbol, not an error, is received, the AP allocates a resource by allocating in the next frame an uplink time slot corresponding to the VLC terminal, and transmits resource allocation information in a control information period 110 in step 303. Then the VLC terminal performs an association process to indicate its presence to the AP.

That is, the VLC terminal sends an AS-REQ message to the AP in the uplink time slot allocated thereto, sets a reception wait time or an association wait time (T_assoc timer), and waits for an AS-RSP message in steps 305 and 307. Upon receiving the AS-REQ message without error, the AP allocates an association ID to the VLC terminal, and sends an AS-RSP message with the association ID to the VLC terminal in step 309. Upon receiving the AS-RSP message, the VLC terminal sends an Association Acknowledgement (AS_ACK) message to the AP in step 311, determining that the association has been made successfully. In this manner, each VLC terminal is allocated a unique association ID in a service set through the association process, and performs data transmission in the uplink time slot allocated thereto using the allocated association ID. The VLC terminal determines a data rate based on the reference rate in current frame and the data rate of the uplink time slot, which is included in the slot information allocated the VLC terminal, and then transmits data at the determined data rate. The AP may allocate, change or cancel a downlink time slot to each VLC terminal in the data transmission process, if necessary.

Thereafter, if the VLC terminal desires to disassociate the association with the AP, the VLC terminal requests disassociation by sending a DisASsociation REQuest (DAS-REQ) message in step 313. In response, the AP disassociates the association with the VLC terminal and sends to the VLC terminal an AS_RSP message with a code indicating a response to the disassociation request, in step 315. For example, a response code in the AS_RSP message may be set to '3'. Upon receiving the AS_RSP message, the VLC terminal sends a DisASsociation ACKnowledgement (DAS_ACK) message to the AP in step 317.

As is apparent from the foregoing description, embodiments of the present invention offer efficient and stable communication by providing a MAC protocol suitable for VLC.

While the invention has been shown and described with reference to certain embodiments thereof, it will be understood by those skilled in the art that various changes in form and details may be made therein without departing from the spirit and scope of the invention as defined by the appended claims and their equivalents.

What is claimed is:

1. A Visible Light Communication (VLC) method in a VLC terminal, comprising:
    requesting initial access to an Access Point (AP) using a mini-slot of a control slot, based on control information included in a frame;
    receiving a next frame comprising the control information including an uplink time slot allocated to correspond to the mini-slot;
    sending an association request to the AP on the allocated uplink time slot; and
    transmitting data at a data rate appointed to the VLC terminal included in control information in a current frame using an association Identifier (ID) included in a response received in reply to the association request and the allocated uplink time slot,
    wherein requesting the initial access comprises:
        selecting the mini-slot from among a plurality of mini-slots, and
        transmitting a control symbol requesting the initial access on the selected mini-slot to the AP.

2. The VLC method of claim 1, wherein requesting initial access is repeatedly performed until the next frame comprising the control information including the uplink time slot allocated to correspond to the selected mini-slot is received.

3. The VLC method of claim 1, further comprising re-performing the association request if there is no response to the association request within an association wait time after the association request.

4. The VLC method of claim 1, wherein requesting initial access comprises:
    determining a position of the control slot in the frame and a number of mini-slots constituting the control slot by analyzing the control information in the frame;
    selecting a backoff timer value randomly within a range of the number of mini-slots;
    decreasing the backoff timer value by one on a frame basis until the backoff timer value is zero (0):
    selecting the mini-slot in the frame having the backoff timer value of zero; (0) and
    transmitting the control symbol on the selected mini-slot.

5. The VLC method of claim 1, wherein the data rate is determined based on an allocation state of wireless resources, a type of a VLC service being provided to the VLC terminal, and data being transmitted to the VLC terminal.

6. The VLC method of claim 1, wherein the frame includes a start flag period, a control information period in which the control information is included, and n time slot periods.

7. The VLC method of claim 6, wherein the control information includes an AP ID, a service type indicating a type of a VLC service being provided to the VLC terminal, a duplex mode indicating a mode for configuring an uplink channel and a frame downlink channel, an uplink start slot, a frame length, a reference rate, and information concerning each time slot.

8. The VLC method of claim 7, wherein the information concerning each time slot includes a type corresponding to the time slot, an ID of a VLC terminal to which the time slot is allocated, and a data rate of the time slot.

9. The VLC method of claim 8, wherein the data rate appointed to the VLC terminal is determined by a combination of the reference rate and the data rate of the time slot.

10. A Visible Light Communication (VLC) method in an Access Point (AP) in a VLC system, comprising:
    receiving an initial access request using a mini-slot a control slot;
    allocating an uplink time slot to correspond to the mini-slot, and transmitting allocation information for the uplink time slot along with control information in a frame;
    upon receiving an association request on the uplink time slot, allocating an association Identifier (ID) to a VLC terminal that sent the association request, and transmitting the association ID to the VLC terminal along with a response to the association request; and receiving data that is transmitted at a data rate appointed to the VLC terminal based on the control information in the frame using the association ID and the uplink time slot, wherein receiving the initial access request comprises receiving a control symbol requesting the initial access on a mini-slot selected from among a plurality of mini-slots.

11. The VLC method of claim 10, wherein the data rate is determined based on an allocation state of wireless resources, a type of a VLC service being provided to the VLC terminal, and data being transmitted to the VLC terminal.

12. The VLC method of claim 10, wherein the frame includes a start flag period, a control information period in which the control information is included, and n time slot periods.

13. The VLC method of claim 12, wherein the control information includes an AP ID, a service type indicating a type of a VLC service being provided to the VLC terminal, a duplex mode indicating a mode for configuring an uplink channel and a frame downlink channel, an uplink start slot, a frame length, a reference rate, and information concerning each time slot.

14. The VLC method of claim 13, wherein the information concerning each time slot includes a type corresponding to the time slot, an ID of a VLC terminal to which the time slot is allocated, and a data rate of the time slot.

15. The VLC method of claim 14, wherein the data rate appointed to the VLC terminal is determined by a combination of the reference rate and the data rate of the time slot.

16. A Visible Light Communication (VLC) system, comprising:

a VLC terminal for requesting initial access to an Access Point (AP) using a mini-slot of a control slot, based on control information included in a frame, receiving a next frame comprising the control information including an uplink time slot allocated to correspond to the mini-slot, sending an association request to the AP on the allocated uplink time slot, and transmitting data at a data rate appointed to the VLC terminal included in control information in the current frame using an association Identifier (ID) included in a response received in reply to the association request and the allocated uplink time slot; and the AP for receiving an initial access request on the selected mini-slot among the plurality of mini-slots constituting the control slot; allocating an uplink time slot to correspond to the selected mini-slot, and transmitting allocation information for the uplink time slot along with control information in a frame, upon receiving an association request on the uplink time slot, allocating an association ID to a VLC terminal that sent the association request, and transmitting the association ID to the VLC terminal along with a response to the association request, and receiving data that is transmitted at a data rate appointed to the VLC terminal based on the control information in the frame using the association ID and the uplink time slot, wherein requesting the initial access comprises:

selecting the mini-slot from among a plurality of mini-slots. and transmitting a control symbol requesting the initial access on the selected mini-slot to the AP.

17. The VLC system of claim 16, wherein the VLC terminal repeatedly performs the initial access request until the next frame comprising the control information including the uplink time slot allocated to correspond to the selected mini-slot is received.

18. The VLC system of claim 16, wherein the VLC terminal re-performs the association request if there is no response to the association request within an association wait time after the association request.

19. The VLC system of claim 16, wherein, to request the initial access, the VLC terminal determines a position of the control slot in the frame and a number of mini-slots constituting the control slot by analyzing the control information in the frame, selects a backoff timer value randomly within a range of the number of mini-slots, decreasing the backoff timer value by one on a frame basis until the backoff timer value is zero (0), selects the mini-slot in a frame having a backoff timer value of zero (0) and transmitting the control symbol on the selected mini-slot.

20. The VLC system of claim 19, wherein the control information includes an AP ID, a service type indicating a type of a VLC service being provided to the VLC terminal, a duplex mode indicating a mode for configuring an uplink channel and a frame downlink channel, an uplink start slot, a frame length, a reference rate, and information about each time slot.

21. The VLC system of claim 20, wherein the information about each time slot includes a type corresponding to the time slot, an ID of a VLC terminal to which the time slot is allocated, and a data rate of the time slot.

22. The VLC system of claim 21, wherein the data rate appointed to the VLC terminal is determined by a combination of the reference rate and the data rate of the time slot.

23. The VLC system of claim 16, wherein the data rate appointed to the VLC terminal is determined based on an allocation state of wireless resources, a type of a VLC service being provided to the VLC terminal, and data being transmitted to the VLC terminal.

24. The VLC system of claim 16, wherein the frame includes a start flag period, a control information period in which the control information is included, and n time slot periods.

* * * * *